US006441837B1

(12) United States Patent
Harding et al.

(10) Patent No.: US 6,441,837 B1
(45) Date of Patent: Aug. 27, 2002

(54) METHOD AND APPARATUS FOR MANIPULATING GEOMETRIC CONSTRAINTS OF A MECHANICAL DESIGN

(75) Inventors: Muri Lee Harding, Tualatin, OR (US); Kevin M. Linscott, Cincinnati, OH (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/076,567

(22) Filed: May 12, 1998

(51) Int. Cl.[7] .................................................. G09G 5/00
(52) U.S. Cl. ........................ 345/856; 345/764; 345/859; 345/964
(58) Field of Search ................................. 345/340, 341, 345/342, 443, 438, 145, 352–354, 348, 339, 764, 769, 770, 784–787, 802–803, 788, 789, 792, 793, 779, 808, 835, 837, 859, 964, 856, 619; 700/96–98, 180–182

(56) References Cited

U.S. PATENT DOCUMENTS

| 4,813,013 | A | * | 3/1989 | Dunn .......................... 345/333 |
|---|---|---|---|---|
| 5,040,131 | A | * | 8/1991 | Torres ......................... 345/348 |
| 5,251,290 | A | * | 10/1993 | Pabon et al. ................. 345/420 |
| 5,299,307 | A | * | 3/1994 | Young ......................... 345/354 |
| 5,371,514 | A | * | 12/1994 | Lawless et al. .............. 345/145 |
| 5,390,294 | A | * | 2/1995 | Takeuchi ..................... 345/440 |
| 5,412,762 | A | * | 5/1995 | Kondo ......................... 345/420 |
| 5,452,238 | A | * | 9/1995 | Kramer et al. ............... 345/443 |
| 5,461,709 | A | * | 10/1995 | Brown ......................... 345/157 |
| 5,506,946 | A | * | 4/1996 | Bar et al. .................... 345/431 |
| 5,564,004 | A | * | 10/1996 | Grossman et al. ........... 345/348 |
| 5,661,502 | A | * | 8/1997 | Cheng ......................... 345/145 |
| 5,726,688 | A | * | 3/1998 | Siefert et al. ................ 345/352 |
| 5,745,112 | A | * | 4/1998 | Hirose ......................... 345/349 |
| 5,778,227 | A | * | 7/1998 | Jordan ......................... 709/302 |
| 5,805,167 | A | * | 9/1998 | Cruyningen ................. 345/353 |
| 5,821,925 | A | * | 10/1998 | Carey et al. ................. 345/331 |
| 5,861,889 | A | * | 1/1999 | Walace et al. ............... 345/438 |
| 5,977,988 | A | * | 11/1999 | Greene ......................... 345/443 |
| 6,016,147 | A | * | 1/2000 | Gantt .......................... 345/420 |
| 6,097,387 | A | * | 8/2000 | Sciammarella et al. ...... 345/341 |
| 6,100,871 | A | * | 8/2000 | Min ............................. 345/145 |
| 6,219,049 | B1 | * | 4/2001 | Zuffante et al. ............. 345/964 |
| 6,246,411 | B1 | * | 6/2001 | Strauss ........................ 345/358 |

OTHER PUBLICATIONS

"Special Edition Using Microsoft Word 97", Que Corporation, 1997, pp. 257–289 and 565–591.*
Alan Borning and Duisberg, Robert, "Constraint–Based for Building User Interfaces", ACM Transactions on Graphics, Oct. 1986.*
Charles Clarke, Bravo New World, Software Review, Nov. 1992.*
Philip Robinson, Engineering Sketchbook: Premise Provides a Flexible Design Tool for use Prior to CAD, Computer Graphics World, pp. 117–121, Sep. 1989.*

* cited by examiner

Primary Examiner—Kristine Kincaid
Assistant Examiner—Thomas J Joseph
(74) Attorney, Agent, or Firm—Columbia IP Law Group, PC

(57) ABSTRACT

Computer instructions for a Computer Aide Design (CAD) system that operate to automatically facilitate a user in manipulating geometric constraints associated with a first piece of geometry of a mechanical design, when executed, are disclosed. The computer instructions operate to facilitate the manipulation responsive to a location of a cursor, when the location is within a predetermined proximity of the first piece of geometry. In one embodiment, the computer instructions are part of a mechanical design software application.

30 Claims, 10 Drawing Sheets

LEGEND:

| ITEM | DESCRIPTION |
|---|---|
| 202 | MECHANICAL DESIGN |
| 204 | GEOMETRY PIECE |
| 206 | CURSOR |
| 208 | GRAPHICAL ICONS |
| 210 | TRANSITORY ICON DISPLAY AREA |

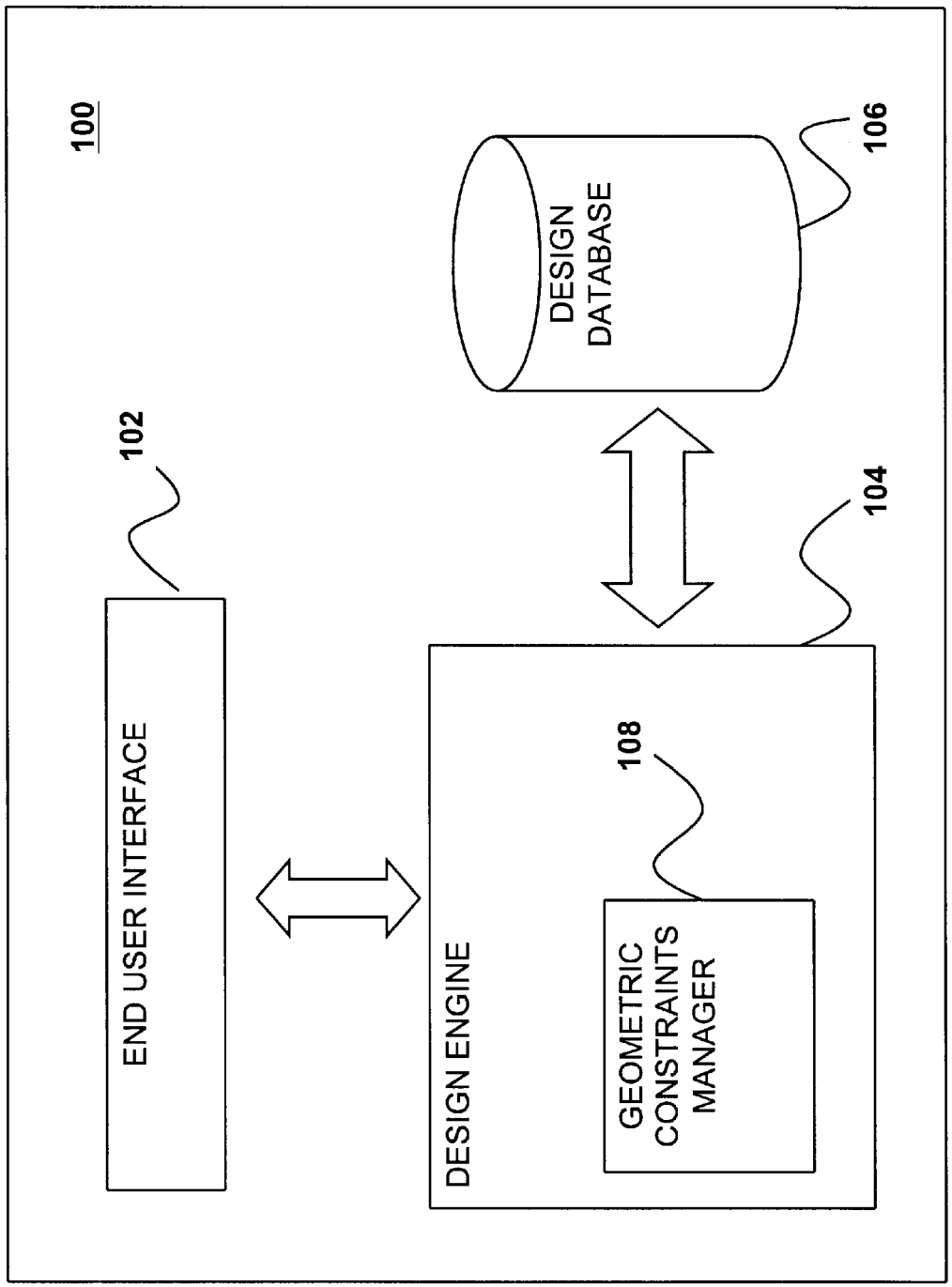

LEGEND:

| ITEM | DESCRIPTION |
|------|-------------|
| 202 | MECHANICAL DESIGN |
| 204 | GEOMETRY PIECE |
| 206 | CURSOR |
| 208 | GRAPHICAL ICONS |
| 210 | TRANSITORY ICON DISPLAY AREA |

LEGEND:

| ITEM | DESCRIPTION |
|---|---|
| 202 | MECHANICAL DESIGN |
| 204 | GEOMETRY PIECE |
| 206 | CURSOR |
| 208 | CONSTRAINT ICONS |
| 210 | TRANSITORY ICON DISPLAY AREA |
| 212 | GEOMETRY PIECE |

LEGEND:

| ITEM | DESCRIPTION |
|------|-------------|
| 202 | MECHANICAL DESIGN |
| 204 | GEOMETRY PIECE |
| 206 | CURSOR |
| 208 | CONSTRAINT ICON REMOVAL |
| 210 | TRANSITORY ICON DISPLAY AREA |

LEGEND:

| ITEM | DESCRIPTION |
|---|---|
| 202 | MECHANICAL DESIGN |
| 204 | GEOMETRY PIECE |
| 206 | CURSOR |
| 208 | CONSTRAINT ICON REMOVED |
| 210 | TRANSITORY ICON DISPLAY AREA |

LEGEND:

| ITEM | DESCRIPTION |
|------|-------------|
| 202 | MECHANICAL DESIGN |
| 204 | GEOMETRY PIECE |
| 206 | CURSOR |
| 208 | CONSTRAINT ICON ADDITION |
| 210 | TRANSITORY ICON DISPLAY AREA |
| 214 | GEOMETRIC PIECE TO CONSTRAIN |

LEGEND:

| ITEM | DESCRIPTION |
|---|---|
| 202 | MECHANICAL DESIGN |
| 204 | GEOMETRY PIECE |
| 206 | CURSOR |
| 208 | CONSTRAINT ICON ADDED |
| 210 | TRANSITORY ICON DISPLAY AREA |
| 212 | GEOMETRY PIECE |
| 214 | GEOMETRIC PIECE CONSTRAINED |

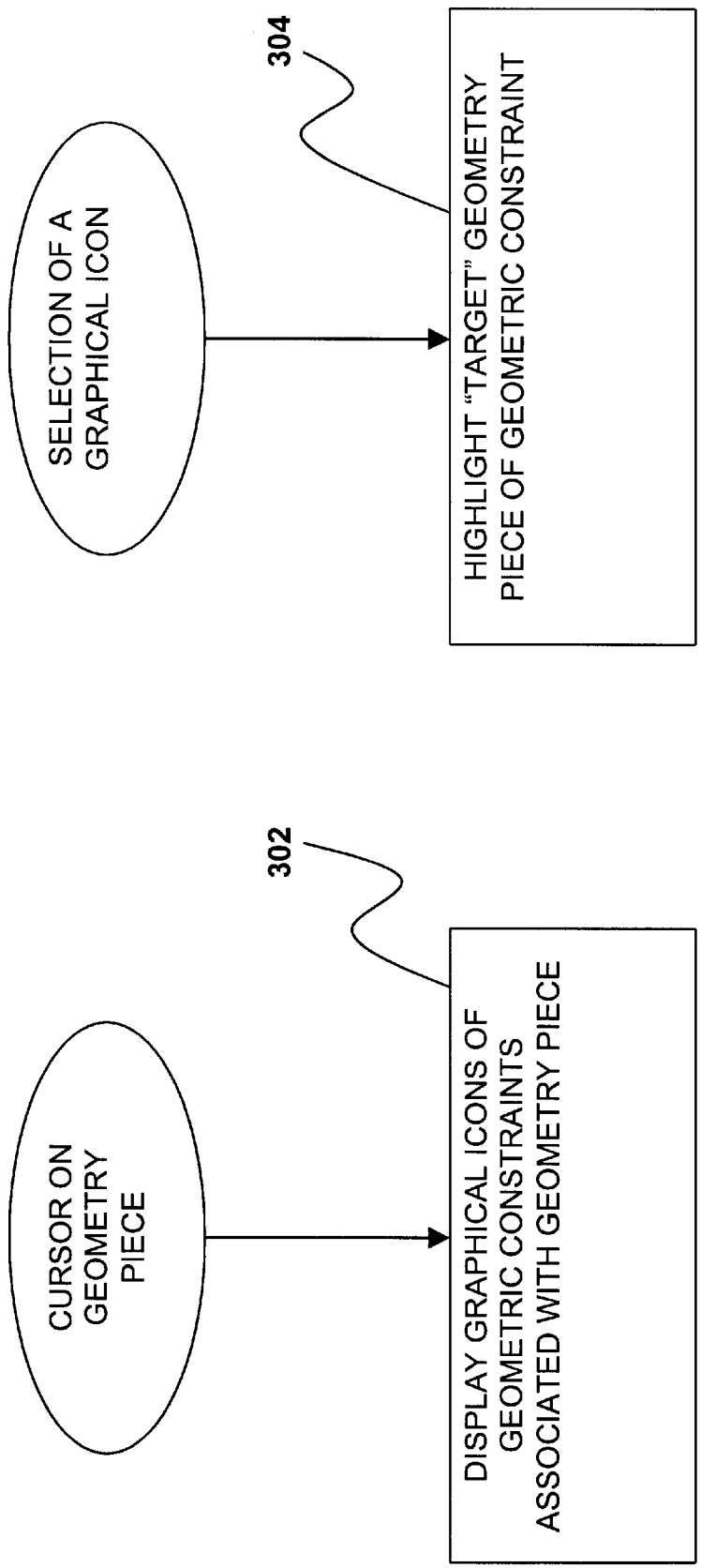

US 6,441,837 B1

METHOD AND APPARATUS FOR MANIPULATING GEOMETRIC CONSTRAINTS OF A MECHANICAL DESIGN

BACKGROUND OF THE INVENTION

1. Field of the Invention

The present invention relates to the field of computer aided design (CAD). More specifically, the present invention relates to computer assistance to a designer on working with geometric constraints of a mechanical design.

2. Background Information

Most mechanical designs require a designer to manipulate geometric constraints between different geometry pieces of a mechanical design. An example of a geometric constraint is a vertical or horizontal orientation to be maintained for a line. Another example is a perpendicular relationship to be maintained between two lines. Yet another example is a tangential relationship to be maintained between a line and an arc. For the purpose of this application, a line, an arc, etc. of a mechanical design shall be generically referred to as geometry pieces of the mechanical design.

Generally, only limited support are provided by conventional mechanical design software on geometric constraint manipulation by a designer. Typically, the support is limited to the simultaneous display of all geometric constraints of all geometric pieces of a mechanical design at the same time. Thus, even when the geometric constraints are represented by graphical icons and "minimized", the display still tends to be cluttered and not very user friendly. Moreover, there is no easy way for the designer to delete or retarget a geometric constraint, without inputting a sequence of commands, which often requires a large number of key strokes. Thus, a more user friendly approach for manipulating geometric constraints is desired. As will be described in more details below, the present invention achieves these and other desirable objectives, which will be apparent from the disclosure to follow.

SUMMARY OF THE INVENTION

Computer instructions that operate to automatically facilitate a user in manipulating geometric constraints associated with a first piece of geometry of a mechanical design, when executed, are disclosed. The executing computer instructions operate to facilitate the manipulation responsive to a location of a cursor, when the location is within a predetermined proximity of the first piece of geometry. In one embodiment, the computer instructions are part of a mechanical design software application. In one embodiment, the mechanical software application including the computer instructions are embodied in a distribution storage medium.

BRIEF DESCRIPTION OF DRAWINGS

The present invention will be described by way of exemplary embodiments, but not limitations, illustrated in the accompanying drawings in which like references denote similar elements, and in which:

FIG. 1 illustrates one embodiment of a mechanical design software application incorporated with the teachings of the present invention;

FIGS. 5a–5c illustrate one embodiment of the relevant operational flows of the geometric constraint manager of FIG. 1.

DETAILED DESCRIPTION OF THE INVENTION

Figure 2A:
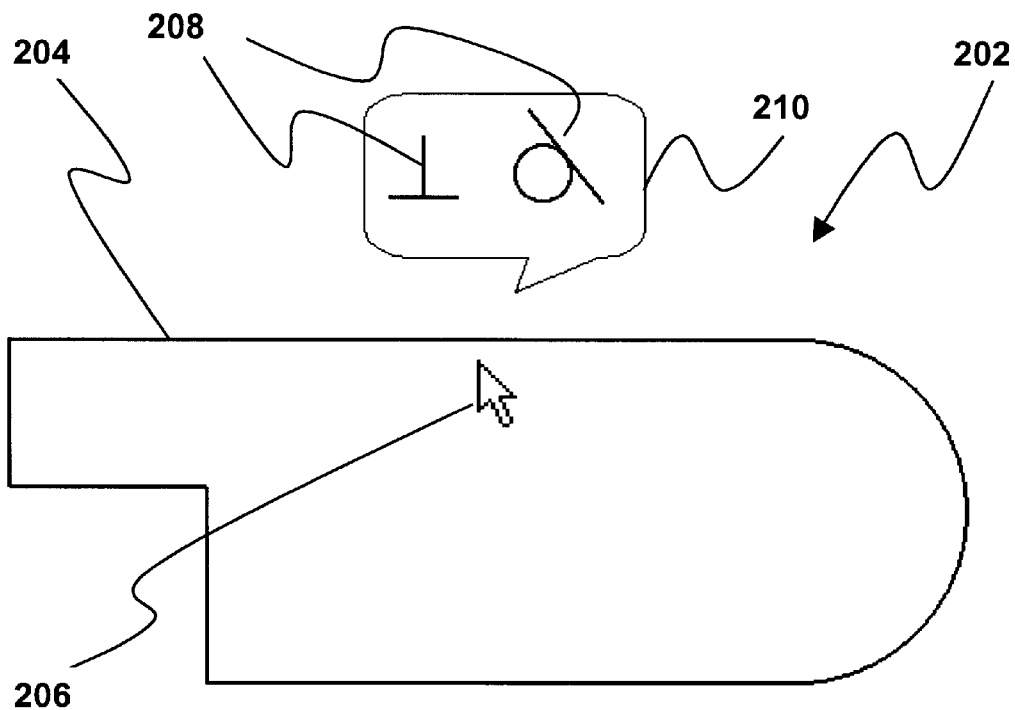
FIGS. 2a–2b illustrate a first aspect of the present invention providing selective viewing of geometric constraints to a designer.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

Referring now FIG. 1, wherein a block diagram illustrating one embodiment of a mechanical design application is shown. As illustrated, mechanical design application 100 includes end user interface 102, design engine 104 and design database 106. Design engine 104 includes in particular geometric constraint manager 108 incorporated with the teachings of the present invention. Together, the elements cooperate to facilitate designing of mechanical designs by a designer. More specifically, end user interface 102 operates to facilitate input by the designer and display of mechanical designs for the designer, under the control of design engine 104. Design database 106 facilitates storage of mechanical designs created by the designer, also under the control of design engine 104. In particular, geometric constraint manager 108 automatically facilitates manipulation of geometric constraints associated with geometry pieces of mechanical designs by the designer. In accordance with the present invention, the automated facilitation are provided responsive to the location of a cursor, relative to the different geometry pieces of a displaced mechanical design, to be described more fully below. Except for the teachings of the present invention incorporated in geometric constraint manager 108, mechanical design application 100 is intended to represent a broad range of mechanical design software known in the art, including but not limited to Mechanical Desktop®, available from Autodesk, Inc. of San Rafael, Calif.

Figure 2B:
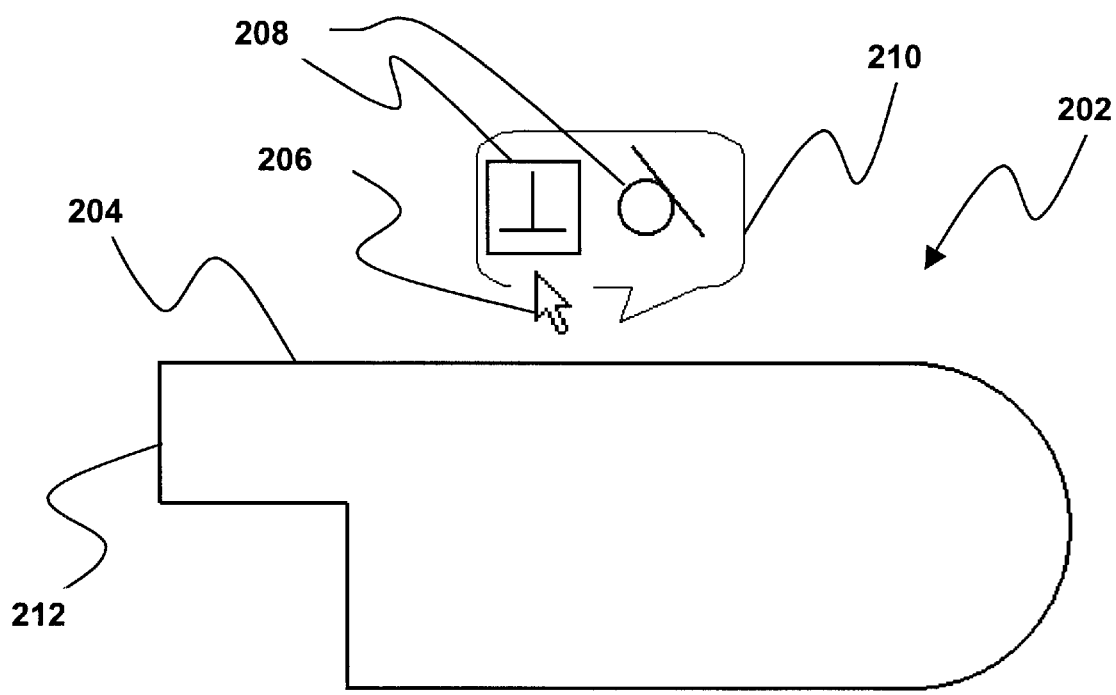

FIGS. 2a–2b illustrate a first aspect of the present invention, the facilitation of viewing of geometric constraints of a displayed mechanical design by a designer. As shown in FIG. 2a, geometric constraint manager 108 operates to automatically cause graphical icons 208 representing geometric constraints associated with geometry piece 204 of mechanical design 202 to be displayed, when cursor 206 is located within a predetermined proxirmiity of geometry piece 204. The size of the predetermined proximity is application dependent, and may be any amount depending on the desired sensitivity. Preferably, it is customizable by the designer. For the illustrated embodiment, graphical icons 208 are caused to be displayed within framed area 210. The framed display is removed when the designer moves the cursor outside the predetermined proximity of the geometry piece. In other words, the designer is automatically notified of the geometric constraints associated with a geometric piece as soon as the designer moves the cursor within the predetermined proximity, without requiring the designer to select the geometry piece or otherwise issue a command, e.g. from selecting a command in a drop down or pop up menu, and the display disappears as the designer moves the cursor away from the geometry piece. Thus, the designer may selectively view the geometric constraints of the different geometry pieces of the mechanical design by moving the cursor around. As will the appreciated by those skilled in the art, the display is much less cluttered and more readily available than the prior art, resulting in substantial improvement in usability.

Additionally, for the illustrated embodiment, as shown by FIG. 2b, geometric constraint manager 108 causes the "target" geometry piece of the geometric constraint, i.e. the geometry piece to which geometry piece 204 is geometrically constrained to, e.g. geometry piece 212, to be highlighted, when the designer selects one of the graphical icons 208. In FIG. 2b, geometry pieces 204 and 212 are constrained to be perpendicular to each other, as represented by the perpendicular graphical icon 208. Geometry piece 212 is highlighted when the designer selects the perpendicular graphical icon 208. For the purpose of this application, selection of a graphical icon includes placement of the cursor within a predetermined proximity of the graphical icon, as well as "clicking" on a graphical icon. Furthermore, for unitary constraints, such as maintaining a vertical/horizontal orientation, the geometry piece itself is considered the "target" geometry piece. Thus, when a user selects a graphical icon representing one of these unitary constraints, change in the display is unnecessary, as the object or "target" of the unitary constraint, i.e. the geometry piece itself is already highlighted. Thus, under the present invention, a designer is not only able to easily and selectively view the geometric constraints associated with the various geometry pieces. The designer is also able to easily and selectively view the "target" geometry piece of each of the geometric constraints.

Figure 3A:
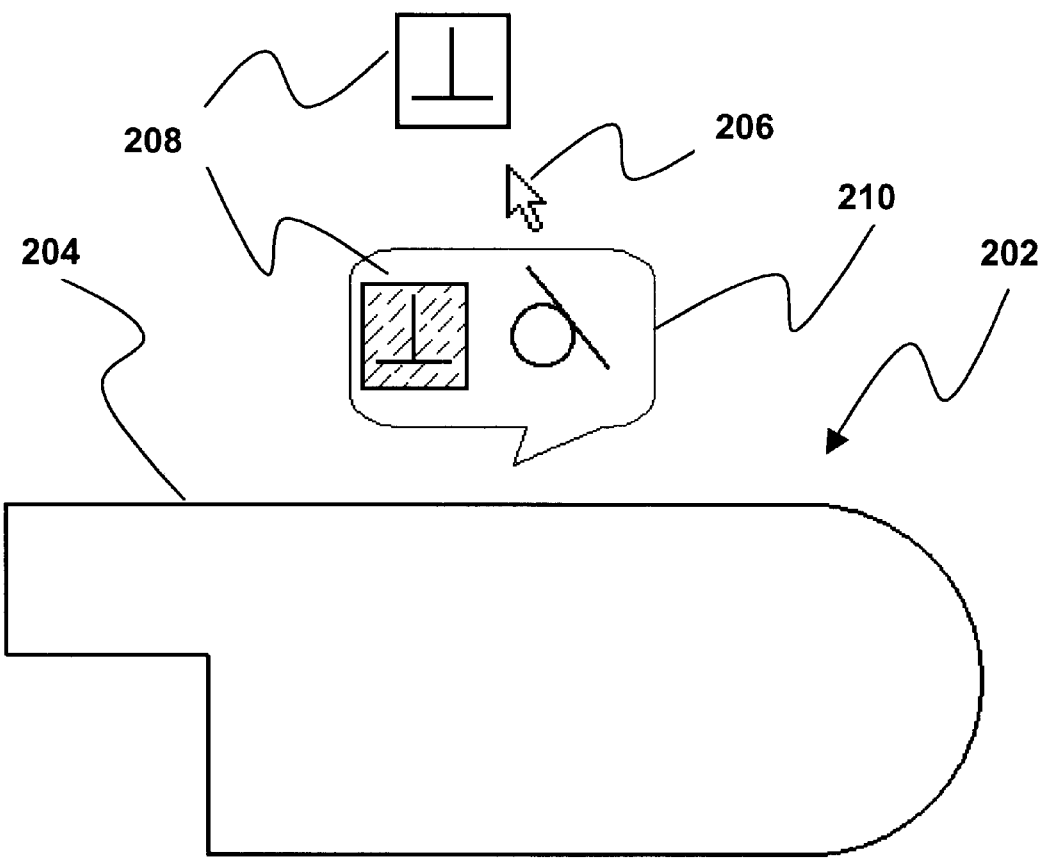
FIGS. 3a–3b illustrate a second aspect of the present invention facilitating removal of geometric constraints by a designer.
Figure 3B:
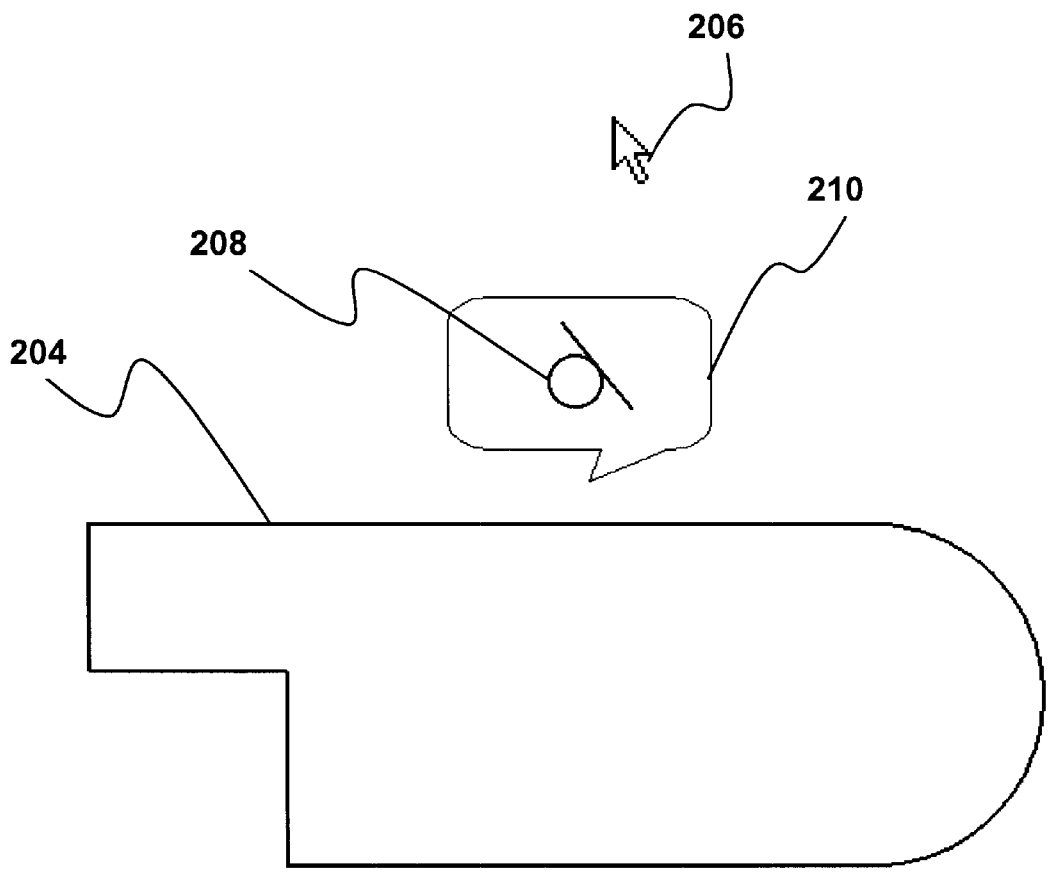

FIGS. 3a–3b illustrate a second aspect of the present invention, the facilitation of removal of geometric constraints of a displayed mechanical design by a designer. As shown by the figures, geometric constraint manager 108 operates to automatically remove a geometric constraint, whenever the user drags and drops the graphical icon 208 representing the geometric constraint in an empty display area. For the illustrated example, once the designer drags and drops the perpendicular graphical icon representing the perpendicular constraint between geometry pieces 204 and 212 in the empty display area, the information denoting the perpendicular constraint is removed from the design database, and the graphical icons displayed are refreshed to reflect the fact that the geometric constraint has been removed. FIG. 3b illustrates the moment immediately after the dragging and dropping of the perpendicular graphical icon 208 into an empty display area. The perpendicular graphical icon is removed from the framed display, leaving only the tangent graphical icon, denoting geometry piece 204 as merely having only one geometric constraint, i.e. the tangent constraint. As will be appreciated by those skilled in the art also, the above described approach for removing geometric constraints also represents significant improvement over the prior art in terms of the number of key strokes and amount of cursor movement otherwise would have been required to effectuate the same result. In alternate embodiments, other types of depository areas may be employed, e.g. a "trash bin" area.

Figure 4A:
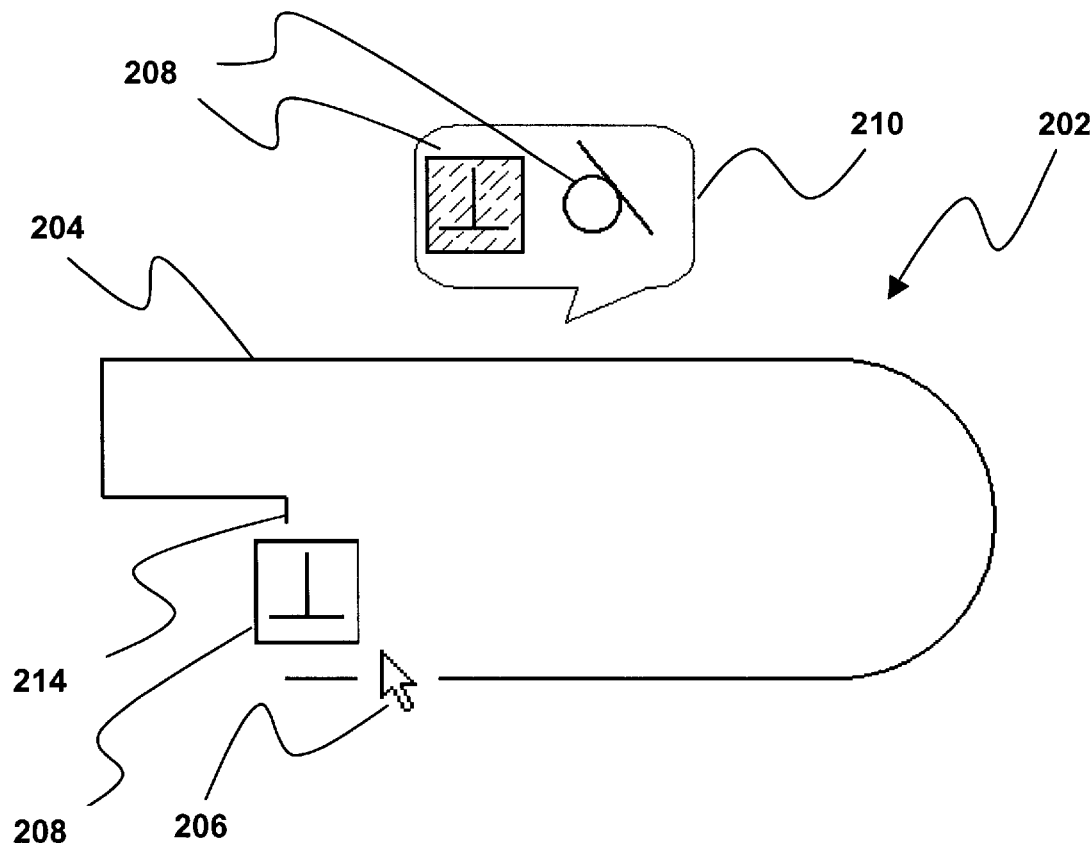
FIGS. 4a–4b illustrate a third aspect of the present invention facilitating re-targeting of geometric constraints by a designer.
Figure 4B:
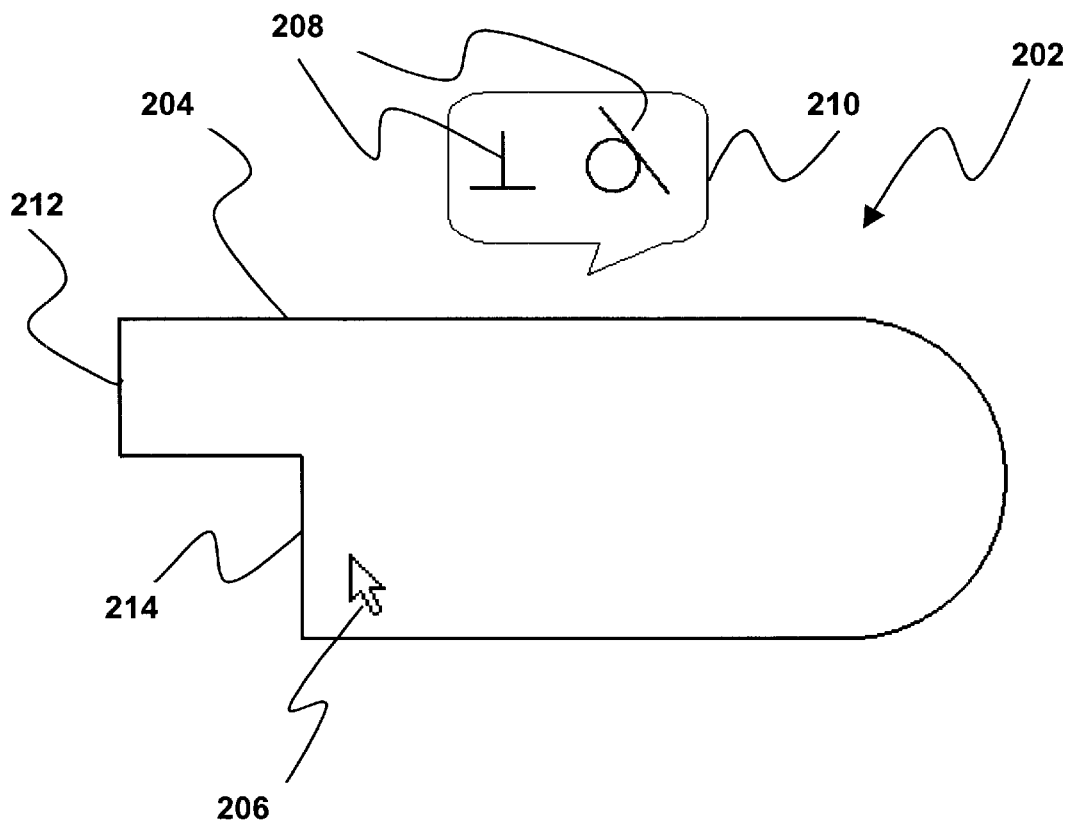

FIGS. 4a–4b illustrate a third aspect of the present invention, the facilitation of re-targeting of geometric constraints of a displayed mechanical design by a designer. As shown by the figures, geometric constraint manager 108 operates to automatically re-target a geometric constraint, whenever the user drags and drops the graphical icon 208 representing the geometric constraint to a different geometric piece, e.g. geometric piece 214. For the illustrated example, once the designer drags and drops the perpendicular graphical icon representing the perpendicular constraint between geometry pieces 204 and 212 over geometry piece 214, the information denoting the perpendicular constraint in the design database is updated to reflect geometric piece 214 as the new "target" geometry piece. That is, geometry pieces 204 and 214 are constrained to be perpendicular to each other, as opposed to geometry pieces 204 and 212. Note that, for the illustrated embodiment, refresh of the graphical icons displayed is not necessary. FIG. 4b illustrates the moment immediately after the design dragging and dropping the perpendicular graphical icon 208 over geometry piece 214. The changes occur internally on the system, and the display remain substantially unchanged. The operation applies similarly to unitary constraints. When an icon representing an unitary constraint is dragged and dropped on a "new" geometry piece, the design database is updated to reflect that the unitary constraint will be imposed on the "new" geometry piece instead. As will be appreciated by those skilled in the art also, the above described approach for re-targeting geometric constraints also represents significant improvement over the prior art in terms of the number of key strokes and amount of cursor movement otherwise would have been required to effectuate the same result.

Figure 5C:
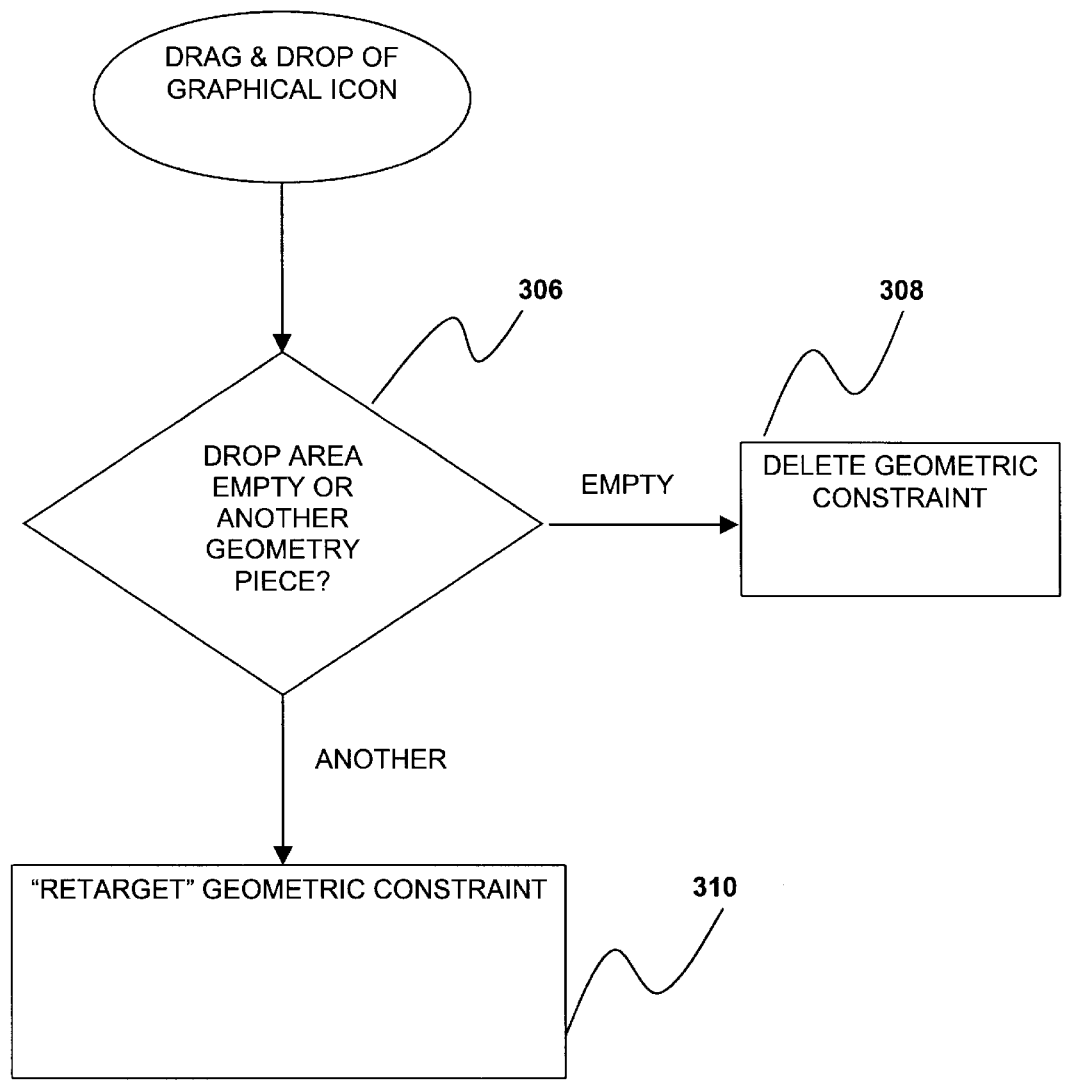

FIGS. 5a–5c illustrate the relevant operational flows of one embodiment of geometric constraint manager 108 of FIG. 1. For the illustrated embodiment, geometric constraint manager 108 is programmed in an event driven model, i.e. geometric constraint manager 108 is designed to be executed in a system environment where various event notification services are available from the operating system. One example of such operating system suitable for practicing the present invention is the Windows® operating systems, available from Microsoft Corporation, of Redmond, Wash. In alternate embodiments, geometric constraint manager 108 may be implemented in other programming approaches known in the art.

As shown in FIG. 5a, responsive to an event notification informing geometric constraint manager 108 of the fact that the user has moved the cursor within the predetermined proximity of a geometry piece of the displayed mechanical design, geometric constraint manager 108 causes other functional blocks of design engine 104 to display the graphical icons representative of the geometric constraints associated with the geometry piece, step 302. The manner in which the other functional blocks effectuate the display is application dependent, and may be implemented in any one of a number of manners known in the art.

As shown in FIG. 5b, responsive to an event notification informing geometric constraint manager 108 of the fact that the user has selected one of the displayed graphical icons, geometric constraint manager 108 causes other functional blocks of design engine 104 to highlight the "target" geometry piece of the geometric constraint represented by the selected graphical icon, step 304. Similarly, he manner in which the other functional blocks effectuate the highlight is application dependent, and may be implemented also in any one of a number of manners known in the art.

As shown in FIG. 5c, responsive to an event notification informing geometric constraint manager 108 of the fact that the user has dragged and dropped one of graphical icons, geometric constraint manager 108 determines if the "drop zone" is an empty area or another geometry piece. If the "drop zone" is an empty area, geometric constraint manager 108 causes other functional blocks of design engine 104 to delete the geometric constraint, and refresh the graphical icons displayed, step 306. On the other hand, if the "drop zone" is another geometry piece, geometric constraint manager 108 causes other functional blocks of design engine 104 to delete the "old" geometric constraint, and establish a "new" geometric constraint with the geometry piece in the "drop zone", step 308. Similarly, the manner in which the other functional blocks effectuate the deletion of the "old" constraint and establishment of the "new" constraint is application dependent, and may be implemented also in any one of a number of manners known in the art.

Figure 6:
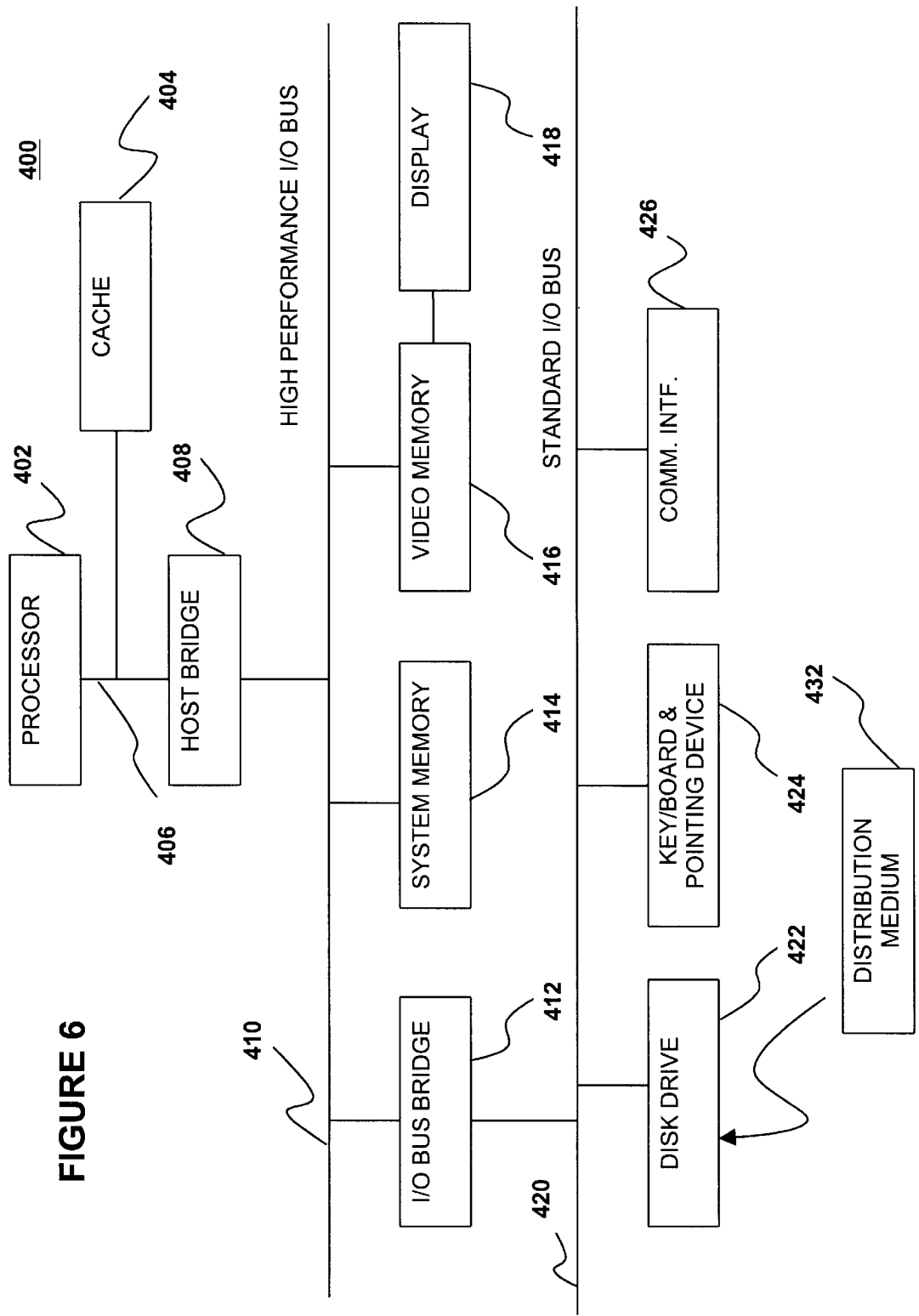
FIG. 6 illustrates one embodiment of a computer system suitable for programming with instructions that implement the present invention.

FIG. 6 illustrates one embodiment of a computer system suitable to be programmed with the mechanical design application of the present invention. As shown, for the illustrated embodiment, computer 400 includes processor 402, processor bus 406, high performance I/O bus 410 and standard I/O bus 420. Processor bus 406 and high performance I/O bus 410 are bridged by host bridge 408, whereas I/O buses 410 and 412 are bridged by I/O bus bridge 412. Coupled to processor bus 406 is cache 404. Coupled to high performance I/O bus 410 are system memory 414 and video memory 416, against which video display 418 is coupled. Coupled to standard I/O bus 420 are disk drive 422, keyboard and pointing device 424, and communication interface 426.

These elements perform their conventional functions known in the art. In particular, disk drive 422 and system memory 414 are used to store permanent and working copies of the mechanical design system. The permanent copies may be pre-loaded into disk drive 422 in factory, loaded from distribution medium 432, or down loaded from a remote distribution source (not shown). Distribution medium 432 may be a tape, a CD, a DVD or other storage medium of the like. The constitutions of these elements are known. Any one of a number of implementations of these elements known in the art may be used to form computer system 400.

In general, those skilled in the art will recognize that the present invention is not limited by the details described, instead, the present invention can be practiced with modifications and alterations within the spirit and scope of the appended claims. The description is thus to be regarded as illustrative instead of restrictive on the present invention.

Thus, a mechanical design application with improved facility for geometric constraint manipulation has been described.

What is claimed is:

1. In a Computer Aided Design (CAD) system, a storage medium having stored therein a plurality of instructions that are machine executable, wherein when executed, the executing instructions operate to:
   automatically facilitate a user in manipulating geometric constraints associated with a first piece of geometry of a mechanical design of the CAD system responsive to a location of a cursor within a predetermined proximity of the first piece of geometry; and
   automatically display manipulatable graphical icons representative of said geometric constraints associated with the first piece of geometry, wherein manipulation of said graphical icons using the cursor results in a corresponding change to said geometric constraints associated with the first piece of geometry of the mechanical design of the CAD system.

2. In a Computer Aided Design (CAD) system, a storage medium having stored therein a plurality of instructions that are machine executable, wherein when executed, the executing instructions operate to automatically facilitate a user in manipulating geometric constraints associated with a first piece of geometry of a mechanical design of the CAD system responsive to a location of a cursor within a predetermined proximity of the first piece of geometry;
   wherein the executing instructions operate to automatically display a number of graphical icons representative of the geometric constraints associated with the first piece of geometry whenever the cursor is placed within the predetermined proximity of the first piece of the geometry.

3. The storage medium of claim 2, wherein the executing instructions further operate to display the graphical icons within a framed area.

4. The storage medium of claim 2, wherein the executing instructions further operate to highlight a second piece of geometry of the mechanical design to which the first piece of geometry is geometrically constrained to responsive to the user selecting one of the graphical icons representative of the geometric constraint.

5. The storage medium of claim 2, wherein the executing instructions further operate to remove a geometric constraint associated with the first piece of geometry responsive to the user dragging and dropping one of the graphical icons representative of the geometric constraint in an empty display area.

6. The storage medium of claim 2, wherein the executing instructions further operate to remove a geometric constraint associated with the first piece of geometry responsive to the user dragging and dropping one of the graphical icons representative of the geometric constraint in a predetermined depository object.

7. The storage medium of claim 2, wherein the executing instructions further operate to retarget a geometric constraint from a second piece of geometry of the mechanical design to which the first piece of geometry is geometrically constrained to a third piece of geometry of the mechanical design responsive to a user dragging and dropping one of the graphical icons representative of the geometric constraint in a display location that is within a predetermined proximity of the third piece of geometry.

8. The storage medium of claim 1, wherein the executing instructions further operate to remove a geometric constraint associated with the first piece of geometry responsive to the user dragging and dropping one of the graphical icons representative of the geometric constraints in an empty display area.

9. The storage medium of claim 1, wherein the executing instructions further operate to remove a geometric constraint associated with the first piece of geometry responsive to the user dragging and dropping one of the graphical icons representative of the geometric constraint in a predetermined depository object.

10. The storage medium of claim 1, wherein the executing instructions further operate to retarget a geometric constraint from a second piece of geometry of the mechanical design to which the first piece of geometry is geometrically constrained to a third piece of geometry of the mechanical design responsive to a user dragging and dropping one of the graphical icons representative of the geometric constraint in a display location that is within a predetermined proximity of the third piece of geometry.

11. In a Computer Aided Design (CAD) system, a method comprising:
    (a) determining if a cursor is within a predetermined proximity of a first piece of geometry of a mechanical design of the CAD system; and
    (b) upon so determining, automatically facilitating a user in manipulating geometric constraints associated with the first piece of geometry of the mechanical design of the CAD system, and automatically displaying manipulatable graphical icons representative of said geometric constraints, wherein manipulation of said graphical icons using the cursor results in a corresponding change to said geometric constraints associated with the first piece of geometry of the mechanical design of the CAD system.

12. The method of claim 11, wherein the method further comprises removing a geometric constraint associated with the first piece of geometry responsive to the user dragging and dropping one of the graphical icons representative of the geometric constraints in an empty display area.

13. The method of claim 11, wherein the method further comprises removing a geometric constraint associated with the first piece of geometry responsive to the user dragging and dropping one of the graphical icons representative of the geometric constraint in a predetermined depository object.

14. The method of claim 11, wherein the method further comprises retargeting a geometric constraint from a second piece of geometry of the mechanical design to which the first piece of geometry is geometrically constrained to a third piece of geometry of the mechanical design responsive to a user dragging and dropping one of the graphical icons representative of the geometric constraint in a display location that is within a predetermined proximity of the third piece of geometry.

15. In a Computer Aided Design (CAD) system, a method comprising:
    (a) determining if a cursor is within a predetermined proximity of a first piece of geometry of a mechanical design of the CAD system; and
    (b) upon so determining, automatically facilitating a user in manipulating geometric constraints associated with the first piece of geometry of the mechanical design of the CAD system;
    wherein (b) comprises (i) automatically display a number of graphical icons representative of the geometric constraints associated with the first piece of geometry.

16. The method of claim 15, wherein (b)(i) comprises displaying the graphical icons within a framed area.

17. The method of claim 15, wherein (b) further comprises
    (ii) determining if a user has selected one of the displayed graphical icons representative of the geometric constraints; and
    (iii) upon so determining highlighting a second piece of geometry of the mechanical design to which the first piece of geometry is geometrically constrained to.

18. The method of claim 15, wherein (b) further comprises:
    determining if a user has dragged and dropped one of the displayed graphical icons representative of a geometric constraint in an empty display area;
    (iii) upon so determining removing the geometric constraint associated with the first piece of geometry represented by the dragged and dropped graphical display icon.

19. The method of claim 15, wherein (b) further comprises:
    (ii) determining if a user has dragged and dropped one of the displayed graphical icons representative of a geometric constraint in a predetermined depository object;
    (iii) upon so determining, removing the geometric constraint associated with the first piece of geometry represented by the dragged and dropped graphical display icon.

20. The method of claim 15, wherein (b) further comprises:
    (ii) determining if a user has dropped and dragged one of the displayed graphical icons representative of a geometric constraint in a display location that is within a predetermined proximity of a third piece of geometry; and
    (iii) upon so determining, re-targeting the geometric constraint represented by the dragged and dropped graphical icon from a second piece of geometry of the mechanical design to which the first piece of geometry is geometrically constrained to, to a third piece of geometry of the mechanical design.

21. In a Computer Aided Design (CAD) system, an apparatus comprising:
    (a) storage medium having stored therein a plurality of instructions that are machine executable, wherein when executed, the executing instructions operate to
        automatically facilitate a user in manipulating geometric constraints associated with a first piece of geometry of a mechanical design of the CAD system responsive to a location of a cursor within a predetermined proximity of the first piece of geometry, and to
        automatically display manipulatable graphical icons representative of said constraints, wherein manipulation of said graphical icons using the cursor results in a corresponding change to said geometric constraints associated with the first piece of geometry of the mechanical design of the CAD system; and
    (b) a processor coupled to the storage medium to execute the instructions.

22. The apparatus of claim 21, wherein the executing instructions further operate to remove a geometric constraint associated with the first piece of geometry responsive to the user dragging and dropping one of the graphical a icons representative of the geometric constraints in an empty display area.

23. The apparatus of claim 21, wherein the executing instructions further operate to remove a geometric constraint associated with the first piece of geometry responsive to the user dragging and dropping one of the graphical icons representative of the geometric constraint in a predetermined depository object.

24. The apparatus of claim 21, wherein the executing instructions further operate to retarget a geometric constraint from a second piece of geometry of the mechanical design to which the first piece of geometry is geometrically constrained to a third piece of geometry of the mechanical design responsive to a user dragging and dropping one of the graphical icons representative of the geometric constraint in a display location that is within a predetermined proximity of the third piece of geometry.

25. In a Computer Aided Design (CAD) system, an apparatus comprising:
 (a) storage medium having stored therein a plurality of instructions that are machine executable, wherein when executed, the executing instructions operate to automatically facilitate a user in manipulating geometric constraints associated with a first piece of geometry of a mechanical design of the CAD system responsive to a location of a cursor within a predetermined proximity of the first piece of geometry; and
 (b) a processor coupled to the storage medium to execute the instructions; wherein the executing instructions operate to automatically display a number of graphical icons representative of the geometric constraints associated with the first piece of geometry whenever the cursor is placed within the predetermined proximity of the first piece of the geometry.

26. The apparatus of claim 25, wherein the executing instructions further operate to display the graphical icons within a framed area.

27. The apparatus of claim 25, wherein the executing instructions further operate to highlight a second piece of geometry of the mechanical design to which the first piece of geometry is geometrically constrained to responsive to the user selecting one of the graphical icons representative of the geometric constraint.

28. The apparatus of claim 25, wherein the executing instructions further operate to remove a geometric constraint associated with the first piece of geometry responsive to the user dragging and dropping one of the graphical icons representative of the geometric constraint in an empty display area.

29. The apparatus of claim 25, wherein the executing instructions further operate to remove a geometric constraint associated with the first piece of geometry responsive to the user dragging and dropping one of the graphical icons representative of the geometric constraint in a predetermined depository object.

30. The apparatus of claim 25, wherein the executing instructions further operate to retarget a geometric constraint from a second piece of geometry of the mechanical design to which the first piece of geometry is geometrically constrained to a third piece of geometry of the mechanical design responsive to a user dragging and dropping one of the graphical icons representative of the geometric constraint in a display location that is within a predetermined proximity of the third piece of geometry.

* * * * *

UNITED STATES PATENT AND TRADEMARK OFFICE
CERTIFICATE OF CORRECTION

PATENT NO. : 6,441,837 B1
DATED : August 27, 2002
INVENTOR(S) : Harding et al.

It is certified that error appears in the above-identified patent and that said Letters Patent is hereby corrected as shown below:

<u>Title page,</u>
Item [75], Inventors, "Muri Lee Harding" should read -- Muir Lee Harding --.

<u>Column 8,</u>
Line 11, "determining if a user ..." should read -- (ii) determining if a user ... --.
Line 62, "... of the graphical a icons" should read -- ... of the graphical icons --.

Signed and Sealed this

Twenty-sixth Day of August, 2003

JAMES E. ROGAN
*Director of the United States Patent and Trademark Office*